United States Patent [19]
Coyle, Jr. et al.

[11] Patent Number: 5,101,090
[45] Date of Patent: Mar. 31, 1992

[54] METHODS AND APPARATUS FOR MAKING OPTICAL FIBER COUPLERS

[75] Inventors: Richard J. Coyle, Jr., Lawrenceville, N.J.; Gary J. Grimes, Thornton, Colo.; Anthony J. Serafino, Cranbury, N.J.

[73] Assignee: AT&T Bell Laboratories, Murray Hill, N.J.

[21] Appl. No.: 615,111

[22] Filed: Nov. 19, 1990

[51] Int. Cl.⁵ .............................................. B23K 26/00
[52] U.S. Cl. ..................... 219/121.68; 219/121.69; 385/15; 385/123
[58] Field of Search ..................... 219/121.68, 121.69; 350/96.15, 96.29

[56] References Cited

U.S. PATENT DOCUMENTS

| | | | |
|---|---|---|---|
| 4,676,594 | 6/1987 | Presby | 350/96.29 |
| 4,989,936 | 2/1991 | Coyle, Jr. et al. | 350/96.15 |
| 5,013,119 | 5/1991 | Coyle, Jr. et al. | 350/96.15 X |

OTHER PUBLICATIONS

"Excimer Lasers: An Emerging Technology in Material Processing," by T. A. Znotins et al., *Laser Focus/Electro-Optics*, May 1987, pp. 54-70.

*Primary Examiner*—C. L. Albritton
*Attorney, Agent, or Firm*—Roderick B. Anderson

[57] ABSTRACT

A cladding portion (15) of an optical fiber (16) is laser machined by focusing a laser beam (13) that is of an appropriate wavelength to ablate the cladding. When the laser beam completely penetrates through the cladding (15) to impinge on the optical fiber core (18) light is transmitted to the two ends of the fiber. A photodetector (31) is placed in close proximity to one of the ends of the optical fiber (16) with the photodetector output being connected to a laser control device (23). When the light detected by the detector exceeds a threshold, it generates a signal that stops the laser. Even if the cladding is of an unpredicted thickness, the laser beam is not terminated until there has been complete penetration through the cladding, and after complete ablation the laser beam is promptly terminated so as to avoid subsequent damage to the optical fiber.

22 Claims, 2 Drawing Sheets

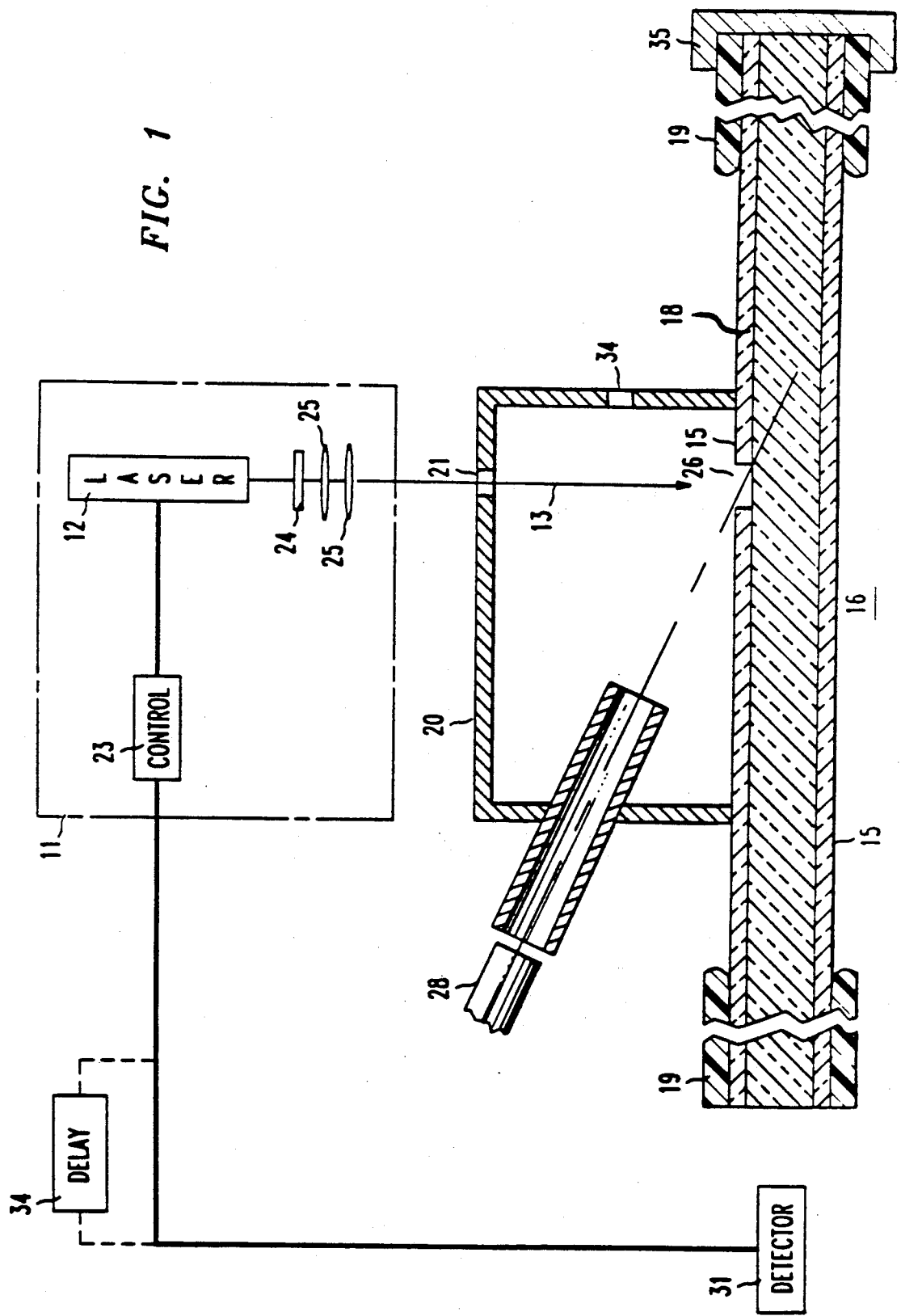

METHODS AND APPARATUS FOR MAKING OPTICAL FIBER COUPLERS

TECHNICAL FIELD

This invention relates to the fabrication of optical fiber couplers and, more particularly, to methods for controllably removing a cladding portion of an optical fiber.

BACKGROUND OF THE INVENTION

Primarily because of their low transition loss, optical fibers, which comprise a cylindrical glass core surrounded by a cladding layer, have become the dominant medium for transmitting information in the form of light. In time, it is foreseen that optical fibers will be used for transmitting light over relatively short distances much as metal conductors presently transmit electrically in electronic circuits. As such time, there will be a great need for inexpensive optical couplers that can controllably remove light from, or apply light to, an optical fiber.

An important step in the fabrication of such optical couplers or optical fiber taps is the controlled removal of part of the cladding to expose part of the core of the optical fiber. The size, shape, position, and cleanliness of the cladding removal is critical in making the coupler; it is also important that the optical fiber core not be damaged mechanically or optically during the cladding removal and that the fabrication method be reasonably convenient to perform. Various mechanical stripping methods and chemical etching methods have been proposed. These methods are suitable for laboratory purposes, but have not proven amenable to mass production because of the difficulty of obtaining a suitably high yield, that is, the difficulty of obtaining a high proportion of usable devices while avoiding serious damage to the optical fiber.

The copending application of Coyle et al., Ser. No. 454,603, filed Dec. 21, 1989, hereby incorporated by reference herein, describes a method for using an excimer laser to remove a cladding portion of an optical fiber by ablation while minimizing damage to the core. The laser produces a beam of ultraviolet light that is absorbed by the cladding but transmitted efficiently by the core so that damage to the core is minimized. A drawback of the invention is that the laser beam is transmitted transversely through the optical fiber core and impinges on the cladding on the side of the optical fiber opposite the laser. It is desired that cladding be removed from only one well defined area, and destruction of the cladding on the opposite side can be quite harmful since it may lead to spurious leakage of optical energy. The Coyle et al. application solves this problem by including on the side of the optical fiber opposite the opening an assembly for containing repair media that can be used to repair such damage. This requirement, of course, further complicates the fabrication of the coupler.

It has been recognized that it would be preferable to control the laser machining of the cladding so as to avoid serious damage to the cladding intended to be left intact. The cladding on optical fibers is not always uniform, and so the Coyle et al. technique can sometimes cause more damage than predicted. In sum, there has been a long-felt need for a method to strip controllably a cladding portion of an optical fiber in a manner that is amenable to mass production, is highly reliable, which does not require greater operator skill, and which does not depend on optical fiber uniformity, particularly of the cladding thickness.

SUMMARY OF THE INVENTION

In accordance with one embodiment of the invention, a cladding portion of an optical fiber is laser machined by focusing a laser beam that is of an appropriate wavelength to ablate the cladding in the general manner described in the Coyle et al. application. We have found that when the laser beam completely penetrates through the cladding to impinge upon the optical fiber core, light is transmitted to the two ends of the fiber. Thus, a photodetector is placed in close proximity to one of the ends of the optical fiber with the photodetector output being connected to a laser control device. When the light detected by the detector exceeds a threshold, it generates a signal that stops the laser. Thus, even if the cladding is of an unpredicted thickness, the laser beam is not terminated until there has been complete penetration through the cladding, and after complete ablation the laser beam is promptly terminated so as to avoid subsequent damage to the optical fiber.

The laser is preferably an excimer laser that generates light in the form of pules. After penetration of the cladding, light is detected by the detector in the form of pulses. To assure complete removal of all of the cladding intended to be removed, one may delay termination of the laser beam until after a predetermined number of pules have been detected. The initial pulses that are detected are of a lower intensity with the intensity increasing thereafter. Complete machining can alternatively be obtained by terminating the machining only after a predetermined threshold of light intensity has been detected.

These and other objects, features and benefits of the invention will be better understood from a consideration of the following detailed description taken in conjunction with the accompanying drawing.

DETAILED DESCRIPTION

Figure 1:
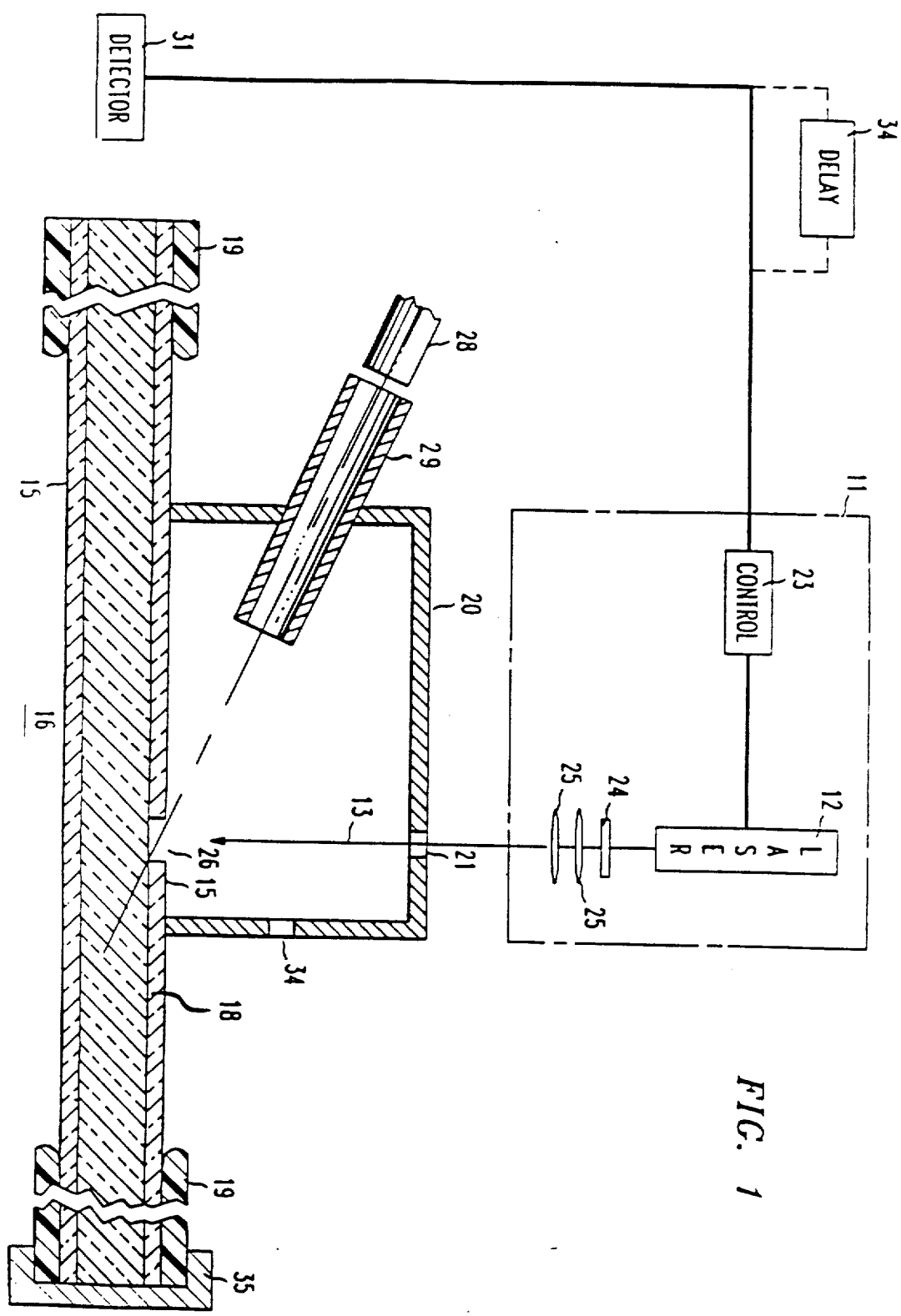
FIG. 1 is a partially sectioned schematic view of apparatus for making an optical coupler in accordance with an illustrative embodiment of the invention.
Figure 2:
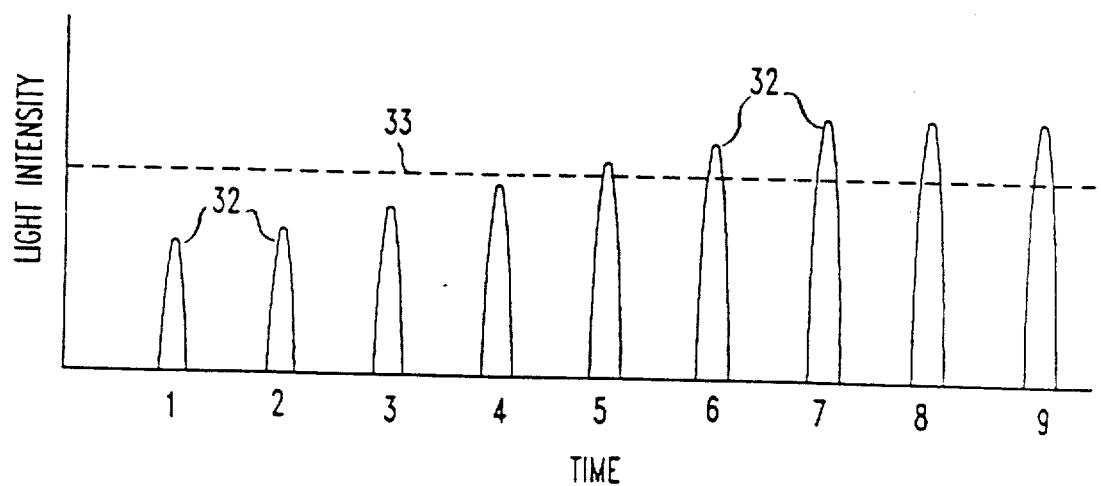

FIG. 1 illustrates schematically apparatus for making an optical fiber coupler, or optical fiber tap, in accordance with an illustrative embodiment of the invention. Some of the dimensions shown are purposely distorted for clarity of exposition. A boring assembly 11 contains a laser 12 for producing a laser beam schematically indicated at 13 for machining an opening in the cladding 15 of an optical fiber 16. The optical fiber comprises a cylindrical glass core 18 surrounded by a cladding 15, typically of a polymer material. A buffer layer 19 of the optical fiber is removed from the region of the optical fiber within which the optical coupler is to be made.

The portion of the optical fiber 16 in which the coupler is to be made is enclosed by a housing 20 containing a window or aperture 21 for admitting the lower beam 13. The laser 12 is preferably an excimer laser, which emits light in an ultraviolet band when properly biased by a controller 23. The laser beam 13 is directed successively through an aperture 24 and lenses 25. The aperture 24 defines the outer periphery of the laser beam and is imaged by lenses 25 onto the portion of cladding 15 that is to be removed. The material of the cladding 15 is relatively absorptive of the laser band of frequencies, while the material of the core 18 is relatively unabsorptive of such frequencies. As is described in the Coyle et al. application, the ultraviolet light of an excimer laser breaks down the chemical bonds of the polymeric material from which cladding 15 is made and removes the cladding by ablation. A discussion of the ablative mechanism of excimer lasers is also included in the article, "Excimer Lasers: An Emerging Technology in Material Processing," by T. A. Znotins et al., *Laser Focus/Electro-Optics*, May, 1987. The ablative mechanism produces an opening 26 in the cladding 15 to expose a portion of the optical fiber core 18. Aperture 24 in combination with lenses 25 defines both the size and shape of opening 26.

After the laser machining step, an optical fiber 28 is inserted in a fiber guide 29 such that one end of fiber 28 is in close proximity to the opening 26. Thereafter, the cavity within housing 20 is filled with a junction medium for aiding optical coupling between optical fiber 16 and optical fiber 28. As is known in the art, this medium may typically be an ultraviolet curable acrylate which may be made to have a different indices of refraction, depending upon whether the coupler is to be used predominantly for extracting optical energy from fiber 16 or for launching optical energy onto fiber 16.

In accordance with the invention, a photodetector 31 is located closely adjacent one end of optical fiber 16. The photodetector 31 is connected to controller 23 which controls the operation of laser 12. When the laser beam 13 has completely penetrated cladding 15, light appears at the end of optical fiber 16, which is detected by detector 31. Detector 31 and controller 23 are operated in any of various ways to turn off laser 12 after sufficient machining has been performed to appropriately define opening 26, but before the laser beam can seriously damage the core 18 of the optical fiber or the portion of the cladding 15 opposite the opening 26.

Figure 2:
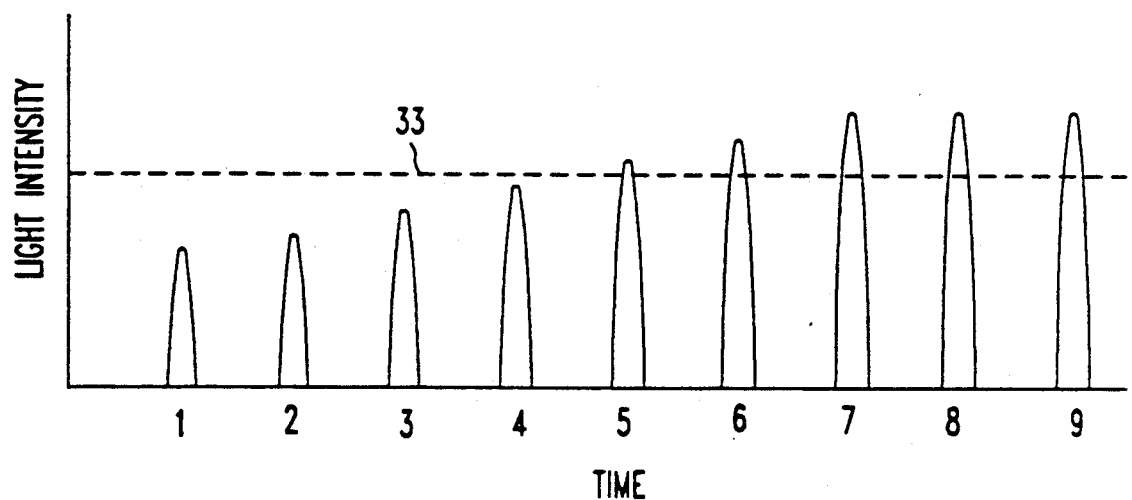
FIG. 2 is a graph of light intensity detected by the detector of FIG. 1 versus time.

The variation of light intensity with time detected by detector 31 is illustrated in FIG. 2. With the laser beam 13 being in the form of pulses, the light intensity detected by the detector 31 will likewise be in the form of pulses 32. As the opening 26 is enlarged with successive pulses, light intensity at the end of the optical fiber becomes progressively larger, as manifested by the increasing height of pulses 32, until it reaches a stable continuous madimum value, as shown.

Normally, it is not desirable to turn off the laser after the first pulse of light appears at the optical fiber end because, at that juncture, machining of the opening is not complete. The exact time at which the laser is turned off is preferably determined by experiment. We have found that the controller 23 can easily be designed to count successive pulses of equal value, and also to turn off laser 12 after three successive pulses of nearly equal magnitude (or having magnitude differences of less than a predetermined value) have been counted. In FIG. 2, that would mean that the laser would be turned off after the reception of the seventh pulse. Controller 23 may have analog or digital means to determine either the peak energy or the total energy per pulse to characterize the pulse magnitude using techniques commonly used in the art.

Alternatively, the laser could be turned off after the light intensity detected has passed some threshold. For example, if the threshold of conduction of the photodetector were the threshold shown by light intensity 33, or if the controller were designed to respond to an electrical signal corresponding to light intensity 33, then the laser would be turned off after the fifth pulse. As still another alternative, a delay device 34 may be connected between the detector 31 and controller 23, as shown in FIG. 1, to provide a predetermined delay between the actuation of the photodetector 31 and the actuation of controller 23 for turning off the laser 12.

Depending upon the materials used for the optical fiber, there may be a trade-off between definition of opening 26 and laser beam damage to be avoided; for example, one may wish to terminate the laser beam before the maximum size of opening 26 has been defined to avoid any possibility of damage to the optical fiber. This, in turn, may dictate the use of a larger aperture 24 for increasing the area of impingement of the laser beam on the optical fiber 16. Alteratively, one may wish to tolerate a certain small degree of damage prior to laser beam termination.

We are not sure of the nature of the physical mechanisms involved in launching the light in optical fiber 16 that is detected by detector 31. Since laser beam impingement is perpendicular to the central axis of the optical fiber 16, on would not expect the clearly detectable pulses to appear at the optical fiber ends. Moreover, there is a frequency shift in the light detected. Although the light beam 13 that was used in our experiments was ultraviolet, some of the light at the end of the optical fiber was visible; in fact, it was the observation of the visible light that led us to the invention. Thus, the detector that is used as detector 31 may be any of a number of known photodetectors including those that are responsive to visible light. A cap 35 may be included on the end of the optical fiber opposite the detector 31 to prevent light from other sources from being transmitted by the optical fiber. The inner surface of cap 35 may be made reflective to visible light to increase the amount of light detected by detector 31.

From the foregoing, one can appreciate that an important benefit of the invention is that the machining operation can be made to the essentially automatic, without reliance on operator skill for terminating the machining. Regardless of coating thickness non-uniformities or other unpredictable factors, the invention provides for laser beam termination at the proper time. The apparatus shown can be combined with known robotic and manipulating apparatus in a mass-production environment in any of various ways that would be obvious to those skilled in the art.

The laser 12 that we have used in our experiments is a Questek Model 2660 laser, which may be operated at a wavelengths of one hundred ninety-three or two hundred forth-eight nanometers. The optical fiber that was used is known as HCS optical fiber, commercially available from the Ensign-Bickford Optics Company, Avon, Connecticut. The beam was first formed by aperture 24 and then imaged through a 4:1 telescope formed by lenses 25. As a consequence, a one millimeter circular aperture formed a circular image of two hundred fifty microns on the optical fiber coating 15. With the laser 12 operated in the pulse mode at one pulse per second, the energy density at the coupler site was in the range of five to ten milli-Joules per square millimeter. The optical fiber core 18 was one millimeter in diameter, the cladding 15 was ten to fifteen microns thick, and buffer layer 19 was two hundred microns thick. The optical fiber core was of glass and the cladding 15 was of a polymeric material. Approximately forty to eighty pulses were required under these circumstances to produce circular holes with diameters of two hundred fifty to six hundred twenty-five microns and elliptical openings of six hundred fifty by three hundred fifty microns. The junction medium was inserted through opening 21 with an opening 34 being used to expel air during the insertion of the coupling medium.

It is to be understood that the embodiment described is intended to be merely illustrative. Other lasers such as the carbon dioxide laser could be used for the laser machining or laser ablation, and it is possible that sources of light other than lasers could be used. Other fiber shapes in addition to cylindrical ones may be used. Laser machining on the flat surfaces of square or rectangular cross-section fibers may be particularly advantageous because of the uniformity of ultraviolet radiation striking the surface. Various other embodiments may be made by those skilled in the art without departing from the spirit and scope of the invention.

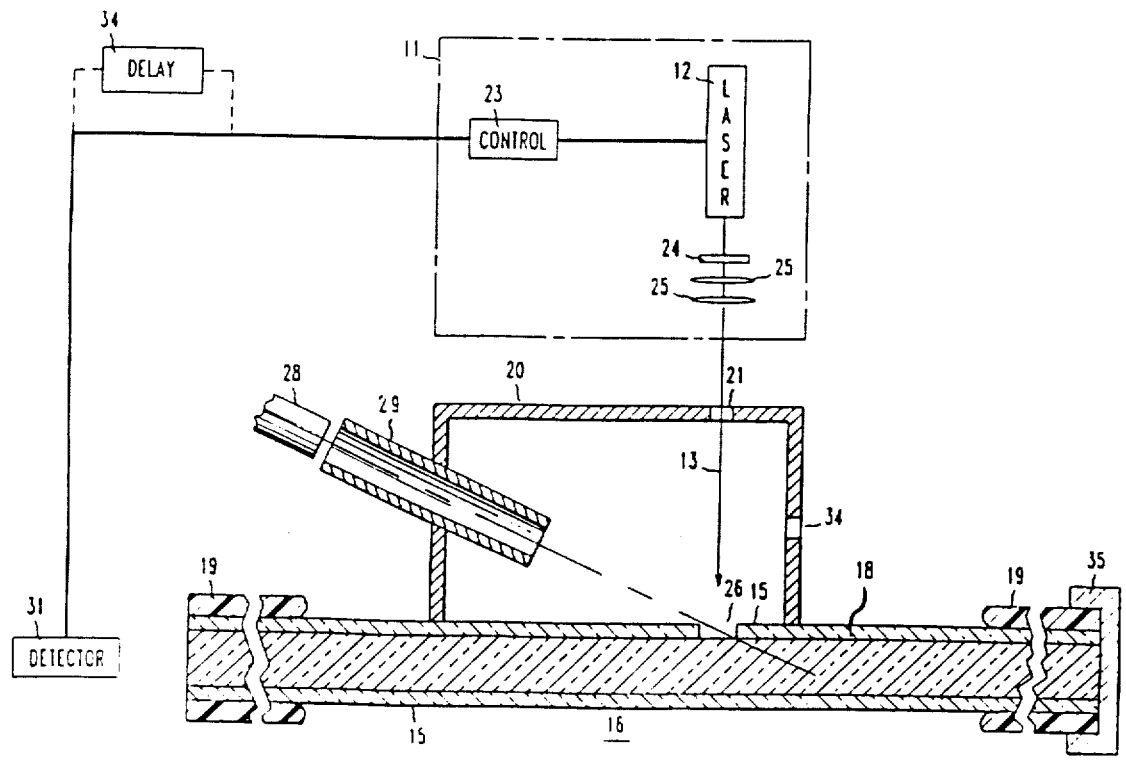

We claim:

1. A method of removing a cladding portion from an optical fiber, the optical fiber comprising an optical fiber core surrounded by cladding, said method comprising the steps of:

forming a first light beam;

focusing sufficient energy of the first light beam onto said cladding portion of the optical fiber to machine through and penetrate the cladding portion;

detecting second light from one end of the optical fiber caused by penetration of the first light beam through the cladding portion;

and using the detected second light to stop impingement of said first light beam on said optical fiber, thereby to obtain complete penetration of the cladding portion upon which the first light beam impinges while reducing the possibility of serious damage to the core or the cladding portion on the side of the optical fiber opposite the light source.

2. The method of claim 1 wherein:

the focusing step comprises the step of directing the radiation through an aperture and imaging the aperture on the optical fiber cladding.

3. The method of claim 2 wherein:

a laser is used to form the first light beam.

4. The method of claim 3 wherein:

the core is made of glass and the cladding is made of a polymer material.

5. The method of claim 1 further comprising the step of:

locating one end of a second optical fiber in close proximity to the removed cladding portion such that, thereafter, a portion of light caused to propagate on the optical fiber will be coupled to the second optical fiber.

6. The method of claim 1 wherein:

during the step of focusing the first light beam on the cladding, no other light source is coupled to the optical fiber, whereby the sole substantial cause of the second light is the first light beam.

7. The method of claim 1 wherein:

the cladding is made of a polymer material.

and the focused light beam has appropriate characteristics for machining the cladding by ablation.

8. The method of claim 3 wherein:

the laser is an excimer laser and the machining of the cladding results from ablation of the cladding by the laser light beam.

9. The method of claim 1 wherein:

the light beam is of an optical frequency predominantly within a limited band of frequencies;

the cladding is of a material that is relatively absorptive of said band of frequencies, and the core is of a material that is relatively unabsorptive of said band of frequencies.

10. The method of claim 1 wherein:

the optical fiber has a central axis;

and the first light beam is directed toward the optical fiber in a direction substantially perpendicular to the central axis.

11. A method for making an optical fiber coupler comprising the steps of:

making a first optical fiber by covering a cylindrical core with a cladding layer;

laser machining an opening in the cladding layer;

the laser machining step comprising the step of directing a laser beam against an exterior surface of the cladding layer;

during the laser machining step, preventing the first optical fiber from transmitting any significant quantities of light except light that might originate from or be caused by the laser beam;

detecting light from one end of the optical fiber during the laser machining step;

and responding to the detected light to terminate the laser machining step.

12. The method of claim 11 wherein:

the machining sep comprises the step of ablating a sufficient portion of the cladding layer to expose a portion of the core.

13. The method of claim 11 wherein:

the laser beam consists of ultraviolet light;

and at least part of the light detected from one end of the first optical fiber is visible light.

14. The method of claim 11 further comprising the steps of:

locating a first end of a second optical fiber in close proximity to the opening in the cladding layer;

and using a junction medium to interconnect the first end of the second optical fiber with the exposed portion of the core of the first optical fiber, whereby light may be coupled between the first optical fiber and the second optical fiber.

15. The method of claim 11 wherein:

the detecting step comprises the step of locating a photodetector in close proximity to said one end of the first optical fiber;

and the responding step comprises the step of using an electrical signal output of the photodetector to stop operation of the laser.

16. The method of claim 11 wherein:

the laser beam is a pulsed laser beam;

the detected light is in the form of pulses;

and the responding step comprises the step of terminating the machining step after a predetermined number of pulses of the detected light have been detected.

17. The method of claim 11 wherein:

the responding step comprises the step of terminating the machining step after a predetermined threshold of intensity of the detected light has been detected.

18. Apparatus for making an optical coupling comprising:

a first optical fiber having first and second ends and comprising a core surrounded by a cladding layer;

a laser for selectively generating a laser beam;

means for focusing sufficient light of the laser beam onto a portion of the cladding layer to machine away such portion and to expose a portion of the core;

a photodetector located in proximity to the first end of the first optical fiber;

means for comprising said photodetector for detecting light produced at the exposed portion of the core due to penetration through the cladding layer by the a laser beam; and means comprising said detecting means for reducing the laser beam power sufficiently to terminate machining of the cladding layer.

19. The apparatus of claim 18 further comprising:

a housing substantially enclosing the portion of the cladding layer to be machined away;

a window in the housing for permitting the laser beam to be directed through the housing toward the cladding layer;

and an optical fiber guide extending through the housing to permit a second optical fiber to be mound with one end thereof in proximity to the exposed portion of the core.

20. The apparatus of claim 18 further comprising:

means defining an aperture in close proximity to the laser and in the path of the laser beam;

and wherein the focusing means comprises means for imaging said aperture onto the cladding layer.

21. The apparatus of claim 18 wherein:

the core is made of glass and the cladding layer is made of a polymer material;

and the laser beam has appropriate characteristics for machining the cladding by ablation.

22. The apparatus of claim 21 wherein:

the laser is an excimer laser;

the cladding is of a material that is relatively absorptive of ultraviolet frequencies, and the core is of a material that is relatively unabsorptive of ultraviolet frequencies.

* * * * *

UNITED STATES PATENT AND TRADEMARK OFFICE
CERTIFICATE OF CORRECTION

PATENT NO. : 5,101,090

DATED : March 31, 1992

INVENTOR(S) : R.J. Coyle, Jr., G.J. Grimes, and A.J. Serafino

It is certified that error appears in the above-indentified patent and that said Letters Patent is hereby corrected as shown below:

TITLE PAGE

The Title page should be deleted to appear as per attached Title page.

IN THE DRAWINGS

Please replace the attached FIGs. 1 and 2 for those in the patent.

Column 1, line 19, "As" should read --At--; Column 1, lines 39-40, "copending application of Coyle et al., Ser. No. 454,603, filed Dec. 21, 1989" should read --U.S. patent of Coyle et al., No. 5,013,119, granted May 7, 1991--; Column 1, line 54, "application" should read --patent--; Column 2, line 10, "application" should read --patent--; Column 2, line 25, "pules" should read --pulses--; Column 2, line 64, "lower" should read --laser--.
Column 3, line 7, "application" should read --patent--; Column 3, line 50, "madimum" should read --maximum--; Column 4, line 26, "on" should read --one--; Column 4, line 43, "the" should read --be--; Column 4, line 54, "a" should be deleted; Column 4, line 55, "forth-eight" should read --forty-eight--.
Column 5, line 4, insert --microns-- after "fifty". Column 5, line 65, after material" change the period to a semicolon; Column 6, line 33, "sep" should read --step--. Column 7, line 16, after "the" delete --a--; Column 8, line 6, "mound" should read --mounted--.

Signed and Sealed this

Eighth Day of March, 1994

Attest:

BRUCE LEHMAN

*Attesting Officer*     Commissioner of Patents and Trademarks

United States Patent [19]

Coyle. Jr. et al.

[11] Patent Number: 5,101,090

[45] Date of Patent: Mar. 31, 1992

[54] METHODS AND APPARATUS FOR MAKING OPTICAL FIBER COUPLERS

[75] Inventors: Richard J. Coyle, Jr., Lawrenceville, N.J.; Gary J. Grimes, Thornton, Colo.; Anthony J. Serafino, Cranbury, N.J.

[73] Assignee: AT&T Bell Laboratories, Murray Hill, N.J.

[21] Appl. No.: 615,111

[22] Filed: Nov. 19, 1990

[51] Int. Cl.⁵ .............................................. B23K 26/00
[52] U.S. Cl. .......................... 219/121.68; 219/121.69; 385/15; 385/123
[58] Field of Search ................... 219/121.68, 121.69; 350/96.15, 96.29

[56] References Cited

U.S. PATENT DOCUMENTS 4,676,594  6/1987  Presby ........................ 350/96.29
4,989,936  2/1991  Coyle, Jr. et al. ........... 350/96.15
5,013,119  5/1991  Coyle, Jr. et al. ........... 350/96.15 X

OTHER PUBLICATIONS

"Excimer Lasers: An Emerging Technology in Material Processing," by T. A. Znotins et al., *Laser Focus/Electro-Optics*, May 1987, pp. 54-70.

Primary Examiner—C. L. Albritton
Attorney, Agent, or Firm—Roderick B. Anderson

[57] ABSTRACT

A cladding portion (15) of an optical fiber (16) is laser machined by focusing a laser beam (13) that is of an appropriate wavelength to ablate the cladding. When the laser beam completely penetrates through the cladding (15) to impinge on the optical fiber core (18) light is transmitted to the two ends of the fiber. A photodetector (31) is placed in close proximity to one of the ends of the optical fiber (16) with the photodetector output being connected to a laser control device (23). When the light detected by the detector exceeds a threshold, it generates a signal that stops the laser. Even if the cladding is of an unpredicted thickness, the laser beam is not terminated until there has been complete penetration through the cladding, and after complete ablation the laser beam is promptly terminated so as to avoid subsequent damage to the optical fiber.

22 Claims, 2 Drawing Sheets